(12) United States Patent
Kovalev et al.

(10) Patent No.: US 6,652,440 B1
(45) Date of Patent: Nov. 25, 2003

(54) ELECTROACTIVE POLYMERS OF HIGH SULFUR CONTENT FOR USE IN ELECTROCHEMICAL CELLS

(75) Inventors: Igor P. Kovalev, Tucson, AZ (US);
Vadim V. Annenkov, Irkutsk (RU);
Steven A. Carlson, Boston, MA (US);
Boris A. Trofimov, Irkutsk (RU)

(73) Assignee: Moltech Corporation, Tucson, AZ (US)

(*) Notice: Subject to any disclaimer, the term of this patent is extended or adjusted under 35 U.S.C. 154(b) by 0 days.

(21) Appl. No.: 09/565,184

(22) Filed: May 3, 2000

Related U.S. Application Data

(60) Provisional application No. 60/132,393, filed on May 4, 1999.

(51) Int. Cl.⁷ .................. C08F 273/00; C08F 271/02
(52) U.S. Cl. .................. 565/535; 525/279; 525/280; 525/281; 525/540
(58) Field of Search .................. 525/279, 280, 525/281, 535, 540

(56) References Cited

U.S. PATENT DOCUMENTS

| | | | |
|---|---|---|---|
| 3,532,543 A | 10/1970 | Nole et al. | |
| 3,953,231 A | 4/1976 | Farrington et al. | |
| 4,469,761 A | 9/1984 | Bennett et al. | |
| 4,664,991 A | 5/1987 | Perichaud et al. | |
| 4,694,062 A | * 9/1987 | Jenekhe | |
| 4,739,018 A | 4/1988 | Armand et al. | |
| 4,937,060 A | 6/1990 | Kathirgamanathan et al. | |
| 4,959,180 A | 9/1990 | Armes et al. | |
| 5,162,175 A | 11/1992 | Visco et al. | |
| 5,278,241 A | 1/1994 | Patil et al. | |
| 5,376,728 A | 12/1994 | Patil et al. | |
| 5,460,905 A | 10/1995 | Skotheim | |
| 5,462,566 A | 10/1995 | Skotheim | |
| 5,529,860 A | * 6/1996 | Skotheim | |
| 5,538,812 A | 7/1996 | Lee et al. | |
| 5,601,947 A | 2/1997 | Skotheim et al. | |
| 5,686,201 A | * 11/1997 | Chu | 528/232 |
| 5,690,702 A | 11/1997 | Skotheim et al. | |
| 5,723,230 A | 3/1998 | Naoi et al. | |
| 5,958,301 A | 9/1999 | Angelopolous et al. | |

FOREIGN PATENT DOCUMENTS

| | | | |
|---|---|---|---|
| FR | 2 591 605 A | | 6/1987 |
| JP | 10 265 567 | * | 10/1998 |
| JP | 10-265567 A | | 10/1998 |
| WO | WO 99/33127 | * | 7/1999 |
| WO | WO 99/33130 | * | 7/1999 |

OTHER PUBLICATIONS

Rauh et al., "A Lithium/Dissolved Sulfur Battery with an Organic Electrolyte", *J. Electrochem. Soc.*, 1979, 126, 523–527.

Yamin et al., "Lithium Sulfur Battery; Oxidation/Reduction Mechanisms of Polysulfide in THF Solutions", *J. Electrochem. Soc.*, 1988, 135, 1045–1048.

Peled et al., "Rechargeable Lithium–Sulfur Battery", *J. Power Sources*, 1989, 26, 269–271.

Kavan et al., "Electrochemistry of Sulfur Adsorbed on Carbon", *Electrochimica Acta*, 1988, 33, 1605–1612.

Novak et al., "Electrochemically Active Polymers for Rechargeable batteries", *Chemical Reviews*, 1997, 97, 207–281.

Naoi et al., "An Enhanced Redox Process of Disulfide Compounds at Polyaniline Film Electrode",*J. Electroanal. Chem.*, 1991, 318, 395–398.

Sotomura et al., "Lithium Polymer Secondary Cell using Disulfide–Polyaniline Composite Cathode and Gel Electrolyte", *Denki Kagaku*, 1993, 61, 1366–1372.

Ye et al., "A New Polypyrrole/Disulfide Electrode Studied by Electrochemistry and the Electrochemical Quartz Crystal Microbalance", *J. Phys. Chem.* 1996, 100, 15848–15855.

Voronkov et al., "Reactions of Sulfur with Organic Compounds", pp. 40–44, Consultants Bureau, New York, 1987.

Pryor, "Mechanisms of Sulfur Reactions", 7–15, McGraw–Hill, New York, 1962.

Schmeisser et al., "Electronic an Magnetic Properties of Polypyrrole Films Depending on their One–dimensional and Two–dimensional Microstructures", *Synthetic Metals*, 1998, 93, 43–58.

Wei et al., "Polymerization of Aniline and Alkyl Ring–substituted Anilines in the Presence of Aromatic Additives",*J. Phys. Chem.* 1990, 94, 7716–7721.

Patent Abstracts of Japan, vol. 1999 No. 1, corresponding to JP 10–265567 A (Oct. 6, 1998).

* cited by examiner

*Primary Examiner*—Ling-Siu Choi
(74) *Attorney, Agent, or Firm*—Jacqueline M. Nicol; Alexander B. Ching; Squire, Sanders & Dempsey L.L.P.

(57) ABSTRACT

Provided is an electroactive organic polymer, which polymer comprises conductive polymer segments and non-conductive polymer segments, having one or more of these polymer segments bonded to polysulfide chains, and wherein the polysulfide chains comprise one or more moieties selected from the group consisting of —$(S_m)$—, —$(S_m)^-$, and $(S_m)^{2-}$, where m is an integer from 3 to 200 and is the same or different at each occurrence. Also provided are composite cathodes comprising such polymers, electrochemical cells comprising such cathodes, and methods of making such polymers, composite cathodes, and cells.

18 Claims, No Drawings

ELECTROACTIVE POLYMERS OF HIGH SULFUR CONTENT FOR USE IN ELECTROCHEMICAL CELLS

RELATED APPLICATION

This application claims priority to U.S. Provisional Patent Application Ser. No. 60/132,393, filed May 4, 1999.

TECHNICAL FIELD

The present invention pertains generally to the field of electroactive cathode materials for electrochemical cells. More particularly, the present invention pertains to cathode materials which comprise an electroactive, organic polymer, wherein the polymer comprises conductive segments and non-conductive segments, which polymer segments are bonded to polysulfide chains, and wherein the polysulfide chains comprise one or more moieties selected from the group consisting of: —$(S_m)$—, —$(S_m)^-$, and $(S^m)^{2-}$, where m is an integer from 3 to 200 and is the same or different at each occurrence. The present invention also pertains to composite cathodes comprising such polymers, to electrochemical cells comprising such cathodes, and to methods of making such polymers, composite cathodes, and cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the evolution of batteries continues, and particularly as lithium batteries become more widely accepted for a variety of uses, the need for safe, long lasting high energy batteries becomes more important. There has been considerable interest in recent years in developing high energy density cathode-active materials for use in high energy primary and secondary batteries with alkali-metal anode materials. Various types of cathode materials for the manufacture of thin film alkali metal batteries are known in the art. Of considerable interest are cathode materials comprising sulfur-sulfur bonds, wherein high energy capacity and rechargeability are achieved by the electrochemical cleavage (via reduction) and reformation (via oxidation) of these bonds. For example, in combination with a lithium anode, elemental sulfur has a specific capacity of 1680 mAh/g, and sulfur-containing polymers with trisulfide and longer polysulfide groups in the polymers have shown specific capacities of more than 1200 mAh/g. Sulfur containing cathode materials disclosed for use in lithium and sodium batteries include, for example, elemental sulfur, organo-sulfur, and carbon-sulfur polymer compositions.

Elemental sulfur is an attractive cathode material in alkali-metal batteries owing to its low equivalent weight, low cost, and low toxicity. Many alkali-metal/sulfur battery cells have been described, as for example, in U.S. Pat. Nos. 3,532,543, 3,953,231, and 4,469,761; Rauh et al., *J. Electrochem. Soc.*, 1979, 126, 523–527; Yamin et al., *J. Electrochem. Soc.*, 1988, 135, 1045–1048; and Peled et al., *J. Power Sources*, 1989, 26, 269–271.

Many problems with alkali metal/elemental sulfur battery cells have been reported. One pertains to alkali-metal sulfides, formed at the positive electrode on discharge, reacting with elemental sulfur to produce polysulfides that are soluble in the electrolyte causing self-discharge and loss of cell capacity. Another problem is that alkali-metal sulfides once reoxidized on cell charge may lead to the formation of an insulating layer on the positive electrode surface which electrochemically and ionically isolates it from the electroactive elements in the cell, resulting in poor cell reversibility and loss of capacity. The electrically and ionically non-conductive properties of sulfur are an obstacle to overcome in cells comprising elemental sulfur.

Attempts have been made to improve the electrochemical accessibility of elemental sulfur in cathodes by adsorbing sulfur onto conductive carbons, as extensively reviewed by Kavan et al., *Electrochimica Acta*, 1988, 33, 1605–1612, or by complexing at least one polysulfurated chain with one dimensional electron conductive polymers as described in U.S. Pat. No. 4,664,991 to Perichaud et al. Polycarbon sulfide compounds are described in U.S. Pat. No. 4,739,018 to Armand et al. Novak et al. in *Chem. Rev.*, 1997, 97, 207–281, extensively review electroactive conductive polymers, including polymers comprising sulfur, for electrochemical cells.

A number of investigations of the electrochemical behavior of organo-sulfur materials, such as for example, in the presence of conductive polymers have been reported. For example, the redox process of disulfide compounds, such as dimercaptothiadiazole, has been shown by Naoi et al., *J. Electroanal. Chem.*, 1991, 318, 395–398, to be enhanced on polyaniline films. Composite cathodes consisting of the same dimercaptan and polyaniline powder showed similar enhanced performance as reported by Sotomura et al., *Denki Kagaku*, 1993, 61, 1366–1372. In an attempt to improve the redox kinetics of dimercaptothiadiazole by the use of a polypyrrole film, it was reported by Ye et al., *J. Electrochem. Soc.*, 1994, 141, L49-L50, that a new composite electrode material is formed when a polypyrrole film is cycled .in an aqueous solution containing dimercaptothiadiazole.

U.S. Pat. Nos. 5,460,905 and 5,462,566, to Skotheim, describe an electrochemical cell which contains a composite cathode comprising carbon-sulfur compounds in combination with a conjugated polymer. U.S. Pat. Nos. 5,529,905, 5,601,947 and 5,690,702 to Skotheim et al. and copending U.S. Patent application Ser. No. 09/033,218, now U.S. Pat. No. 6,117,590, to Skotheim et al. of the common assignee describe sulfur-containing organic polymer materials which undergo oxidation and reduction with the formation and breaking, respectively, of many sulfur-sulfur bonds which are attached to conjugated structures. The conjugated polymer structures provide good electron transport and fast electrochemical kinetics at ambient temperatures and below. The incorporation of large fractions of polysulfur components in the carbon-sulfide polymer materials provides the exceptionally high storage capacity per unit weight of material. Upon reduction and oxidation, these materials need not lead to de-polymerization and re-polymerization of the polymer backbone.

U.S. Pat. No. 5,723,230 to Naoi et al describes sulfur-containing electrode materials for secondary batteries which contain from 2 but not more than 6 continuous S—S bonds.

Despite the various approaches proposed for the fabrication of high energy density alkali metal rechargeable cells containing elemental sulfur, organo-sulfur, and carbon-sulfur polymer cathode materials, there remains a need for materials that improve the utilization of electroactive cathode materials and the cell efficiencies and provide rechargeable cells with high sustainable capacities over many cycles.

It is therefore an object of the present invention to provide composite cathodes containing electroactive sulfur-containing cathode materials that exhibit a high utilization of the available electrochemical energy and retain this energy capacity without significant loss over many charge-discharge cycles.

It is another object of the present invention to provide high sulfur content polymers useful as cathode materials with high surface areas and structures that exhibit high charge and discharge rates, and to provide processes for making such high sulfur content polymers.

It is a further object of this invention to provide methods for fabricating cathode elements comprising the high sulfur content polymers of the present invention.

It is yet a further objective of this invention to provide energy storing rechargeable battery cells which incorporate such composite cathodes, and which exhibit much improved self-discharge characteristics, long shelf life, improved capacity, and high manufacturing reliability.

SUMMARY OF THE INVENTION

The present invention pertains to electroactive organic polymers, wherein the polymers, in their oxidized state, comprise conductive polymer segments and non-conductive polymer segments, wherein one or more of the conductive and non-conductive polymer segments are bonded to polysulfide chains; and further wherein the polysulfide chains comprise one or more moieties selected from the group consisting of —$(S_m)$—, —$(S_m)^-$, and $(S_m)^{2-}$; where m is an integer from 3 to 200 and is the same or different at each occurrence.

In one embodiment, the conductive polymer segments are grafts on a polymer backbone of the non-conductive polymer segments.

In one embodiment, the conductive polymer segments of the polymer comprise one or more moieties formed by polymerization of one or more monomers selected from the group consisting of pyrrole, aniline, indole, phenylene diamines, thiophene, acetylene, phenylene, vinyl phenylene, vinyl thienylene; and their substituted derivatives. In one embodiment, the conductive polymer segments comprise pyrrole. In one embodiment, the conductive polymer segments comprise aniline.

In one embodiment, the non-conductive polymer segments of the polymer comprise one or more moieties formed by polymerization of one or more monomers selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethyl ammonium salts, and vinyl-1-methyl-pyridinium salts. In one embodiment, the non-conductive polymer segments comprise vinyl imidazole repeating units. In one embodiment, the non-conductive polymer segments comprise aminostyrene repeating units.

In one embodiment, the conductive polymer segments comprise pyrrole repeating units and the non-conductive polymer segments comprise vinyl imidazole repeating units. In one embodiment, the conductive polymer segments comprise aniline repeating units and the non-conductive polymer segments comprise vinyl imidazole repeating units.

In one embodiment, the polymer comprises conductive polymer segments and non-conductive polymer segments and the polysulfide chains comprise covalent moieties, —$(S_m)$—, which covalent moieties are covalently bonded by one or both of their terminal sulfur atoms as a side group to the polymer segments. In one embodiment, the polysulfide chains comprise polysulfide anion moieties, —$(S_m)^-$, which anion moieties are covalently bonded by a terminal sulfur atom to the polymer. In one embodiment, the polysulfide chains comprise polysulfide dianion moieties, —$(S_m)^{2-}$, and the conductive polymer segments and/or the non-conductive polymer segments comprise positively charged atoms, wherein the dianion moieties are ionically bonded to one or more of the positively charged atoms.

In one embodiment, the polymer comprises greater than 50% by weight of sulfur. In a preferred embodiment, the polymer comprises greater than 75% by weight of sulfur., In another embodiment, the electroactive organic polymer, in its oxidized state, is of the formula:

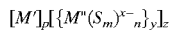

wherein:

M' is a non-conductive repeating unit and is the same or different at each occurrence;

M" is a conductive repeating unit and is the same or different at each occurrence;

n is an integer from 0 to 3 and is the same or different at each occurrence, with the proviso that the number of $(S_m)^{x-}$ moieties in the polymer is greater than or equal to 1;

y is an integer from 8 to 1000;

m is an integer from 3 to 200 and is the same or different at each occurrence;

x is an integer from 0 to 2 and is the same or different at each occurrence;

p is an integer from 2 to 20,000; and z is an integer from 1 to 100, where z is less than or equal to p.

In one embodiment, M" comprises one or more monomers selected from the group consisting of pyrrole, aniline, indole, phenylene diamines, thiophene, acetylene, phenylene, vinyl phenylene, vinyl thienylene; and their substituted derivatives.

In one embodiment, M' comprises one or more monomers selected from the group consisting of vinyl imidazole, aminostyrene, vinyl oxazoline, dimethylaminopropyl methacrylamide, dimethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethyl ammonium salts, and vinyl-1-methyl-pyridinium salts.

In one embodiment, M" is pyrrole. In one embodiment, M" is aniline.

In one embodiment, M' is vinyl imidazole. In one embodiment, M' comprises one or more monomers selected from the group consisting of diallyldimethyl ammonium salts, methacryloyloxyethyl trimethyl ammonium salts, methacrylamidopropyl trimethyl ammonium salts, and vinyl-1-methyl-pyridinium salts.

In one embodiment, M' is vinyl imidazole and M" is pyrrole. In one embodiment, M' comprises one or more monomers selected from the group consisting of diallyldimethyl ammonium salts, methacryloyloxyethyl trimethyl ammonium salts, methacrylamidopropyl trimethyl ammonium salts, and vinyl-1-methyl-pyridinium salts; and M" is pyrrole.

In one embodiment, M' is vinyl imidazole and M" is aniline. In one embodiment, M' comprises one or more monomers selected from the group consisting of diallyldimethyl ammonium salts, methacryloyloxyethyl trimethyl ammonium salts, methacrylamidopropyl trimethyl ammonium salts, and vinyl-1-methyl-pyridinium salts; and M" is aniline.

In one embodiment, the polymer comprises greater than 50% by weight of sulfur. In a preferred embodiment, the polymer comprises greater than 75% by weight of sulfur Another aspect of the present invention pertains to a method of making an electroactive, grafted organic polymer of this invention, the method comprising the steps of: (a) providing a dispersion of elemental sulfur in a liquid medium containing a non-conductive polymer; (b) adding to the dispersion of step (a) a precursor of a conductive polymer repeating unit and a polymerization initiator comprising an oxidant; (c) stirring the mixture of step (b) thereby forming an electroactive, grafted organic polymer; and (d) separating the polymer from the reaction medium.

In one embodiment, the particle size of the elemental sulfur is from 0.01 microns to 100 microns.

In one embodiment, the liquid medium comprises water.

In one embodiment, the weight ratio of the repeating units of the conductive polymer segments to the non-conductive polymer segments is from 1:1 to 20:1.

In one embodiment, the weight ratio of the sum of the repeating units of the conductive polymer segments and non-conductive polymer segments to sulfur is from 1:1 to 1:15.

In one embodiment, the polymerization initiator comprises an oxidant selected from the group consisting of $FeCl_3$, $Fe(NO_3)_3$, $CuCl_2$, $H_2O_2$, $(NH_4)_2S_2O_8$, $KIO_3$, $I_2$, $KMnO_4$, and $K_2Cr_2O_7$.

In one embodiment, the method further comprises, after step (d), one or more steps of: (e) purifying the polymer after separation; and (f) drying the polymer.

One aspect of the invention pertains to an electroactive, grafted organic polymer prepared by the methods described herein. In one embodiment, the polymer comprises greater than 50% by weight of sulfur. In a preferred embodiment, the polymer comprises greater than 75% by weight of sulfur.

Another aspect of the present invention pertains to composite cathodes comprising the electroactive, grafted organic polymers of this invention for use in electrochemical cells. In one embodiment, the cathode comprises: (a) an electroactive organic polymer comprising conductive polymer segments and non-conductive polymer segments wherein one or more of the conductive and non-conductive polymer segments are bonded to polysulfide chains; and further wherein the polysulfide chains comprise one or more moieties selected from the group consisting of $-(S_m)-$, $-(S_m)^-$, and $(S_m)^{2-}$; where m is an integer from 3 to 200 and is the same or different at each occurrence; and (b) one or more conductive fillers selected from the group consisting of conductive carbons, graphites, activated carbon fibers, non-activated carbon nanofibers, metal flakes, metal powders, metal fibers, carbon fabrics, metal mesh, electrically conductive polymers, and electrically conductive metal chalcogenides.

In one embodiment, the polymer of (a) provides the electrically conductive filler of (b) based on the electrically conductive properties of the polymer of (a).

In one embodiment, the cathode further comprises elemental sulfur.

Another aspect of the present invention pertains to a method of preparing a composite cathode comprising the electroactive organic polymers of the present invention, as described herein, which method comprises the steps of: (a) dispersing or suspending in a liquid medium the electroactive polymer of this invention; (b) optionally adding to the mixture of step (a) a conductive filler; (c) mixing the composition resulting from step (b) to disperse the electroactive polymer, thereby forming a composition having a desired consistency and particle size distribution; (d) casting the composition resulting from step (c) onto a substrate; and (e) removing some or all of the liquid from the composition resulting from step (d) to provide a composite cathode.

In one embodiment, the method further comprises, subsequent to step (e), the step (f) of heating the composite cathode structure to a temperature of 120° C. or greater.

In one embodiment, the method further comprises the addition to any or all of the steps (a), (b), or (c) of one or more materials selected from the group consisting of binders, electrolytes, non-electroactive metal oxides, and electroactive transition metal chalcogenides.

Another aspect of the present invention pertains to an electrochemical cell. The cell of this invention comprises an anode; a composite cathode comprising an electroactive organic polymer of the present invention, as described herein; and an electrolyte interposed between the anode and the composite cathode. In one embodiment, the anode comprises one or more materials selected from the group consisting of lithium metal, lithium-aluminum alloys, lithium-tin alloys, lithium-intercalated carbons, and lithium-intercalated graphites. In one embodiment, the electrolyte is an organic electrolyte comprising one or more materials selected from the group consisting of liquid electrolytes, gel polymer electrolytes, and solid polymer electrolytes.

Another aspect of the present invention pertains to methods of forming an electrochemical cell. The methods comprise the steps of providing an anode; providing a cathode comprising an electroactive organic polymer of the present invention, as described herein; and interposing an electrolyte between the anode and the cathode.

DETAILED DESCRIPTION OF THE INVENTION

Electroactive, Graft Polymers

One aspect of the present invention pertains to electroactive cathode materials, which are electroactive, grafted organic polymers and which comprise conductive polymer segments and non-conductive polymer segments bonded to polysulfide chains.

The terms "conductive polymer" and "conductive organic polymer", as used herein, refer, respectively, to polymers and organic polymers having conjugated π-electron polymeric segments which can be oxidized and reduced reversibly and which have electrically conductive properties in at least one of their oxidation states. The term "conductive monomer", as used herein, refers to monomers which form conductive polymers or polymer segments upon polymerization. The term "non-conductive polymer", as used herein, refers to polymers lacking conjugated π-electron polymeric segments which can be oxidized and reduced reversibly. The term "non-conductive monomer", as used herein, refers to monomers which form non-conductive polymers or polymer segments upon polymerization.

The term "monomer" is used herein to describe moieties that are capable of reacting to form polymers.

The term "repeating unit", as used herein, refers to one or more moieties in a polymer derived from the polymerization of one or more monomers. For example, the term "aniline repeating units" refers to those aniline repeating units present in polyaniline (I) and to any of the various forms of polyaniline such as, for example, leuco emeraldine (y=1), emeraldine (y=0.5), and pemigraniline (y=0), as shown below, (I).

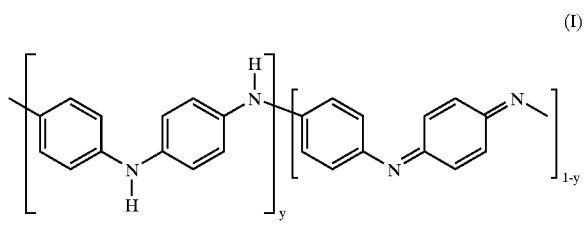
(I)

The term "polysulfide chain", as used herein, relates to a divalent chemical moiety, $-(S_m)-$, $-(S_m)^-$, or $(S_m)^{2-}$, which is bonded covalently, covalently and ionically, or ionically to polymer repeating units.

The present invention pertains to electroactive organic polymers, wherein the polymers, in their oxidized state, comprise conductive polymer segments and non-conductive polymer segments, wherein one or more of the conductive and non-conductive polymer segments are bonded to polysulfide chains; and further wherein the polysulfide chains comprise one or more moieties selected from the group consisting of: $-(S_m)-$, $-(S_m)^-$, and $(S_m)^{2-}$; where m is an integer from 3 to 200 and is the same or different at each occurrence. In one embodiment, m is an integer from 9 to 200 and is the same or different at each occurrence. In another embodiment, m is an integer from 24 to 100 and is the same or different at each occurrence. In a preferred embodiment, the polysulfide chains comprise one or more $-(S_m)-$, $-(S_m)^-$, and $(S_m)^{2-}$ moieties.

In one embodiment, the conductive polymer segments are grafts on a polymer backbone of the non-conductive polymer segments.

In one embodiment, the conductive polymer segments of the polymer comprise one or more moieties formed by polymerization of one or more monomers selected from the group consisting of pyrrole, aniline, indole, phenylene diamines, thiophene, acetylene, phenylene, vinyl phenylene, vinyl thienylene; and their substituted derivatives. In one embodiment, the conductive polymer segments comprise pyrrole. In one embodiment, the conductive polymer segments comprise aniline.

In one embodiment, the non-conductive polymer segments of the polymer comprise one or more moieties formed by polymerization of one or more monomers selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethyl ammonium salts, and vinyl-1-methylpyridinium salts. In one embodiment, the non-conductive polymer segments comprise vinyl imidazole repeating units. In one embodiment, the non-conductive polymer segments comprise aminostyrene repeating units.

In one embodiment, the conductive polymer segments comprise pyrrole repeating units and the non-conductive polymer segments comprise vinyl imidazole repeating units. In one embodiment, the conductive polymer segments comprise aniline repeating units and the non-conductive polymer segments comprise vinyl imidazole repeating units.

In one embodiment, the polymer comprises conductive polymer segments and non-conductive polymer segments and the polysulfide chains comprise covalent moieties, $-(S_m)-$, which covalent moieties are covalently bonded by one or both of their terminal sulfur atoms as a side group to the polymer segments. In one embodiment, the polysulfide chains comprise polysulfide anion moieties, $-(S_m)^-$, which anion moieties are covalently bonded by a terminal sulfur atom to the polymer. In one embodiment, the polysulfide chains comprise polysulfide dianion moieties, $(S_m)^{2-}$, and the conductive polymer segments and/or the non-conductive polymer segments comprise positively charged atoms, wherein the dianion moieties are ionically bonded to one or more of the positively charged atoms. In a preferred embodiment, the polysulfide chains comprise covalent moieties, $-(S_m)-$, polysulfide anion moieties, $-(S_m)^-$, and polysulfide dianion moieties, $(S_m)^{2-}$.

Electroactive organic polymers of the present invention, may be described by the formula (II):

$$[M'_p[\{M''(S_m)^{x-}_n\}_y]_z \quad \text{II}$$

wherein:

M' is a non-conductive repeating unit and is the same or different at each occurrence;

M" is a conductive repeating unit and is the same or different at each occurrence;

n is an integer from 0 to 3 and is the same or different at each occurrence, with the proviso that the number of $(S_m)^{x-}$ moieties in the polymer is equal to or greater than 1;

y is an integer from 8 to 1000;

m is an integer from 3 to 200 and is the same or different at each occurrence;

x is an integer from 0 to 2 and is the same or different at each occurrence;

p is an integer from 2 to 20,000; and z is an integer from 1 to 100, where z is less than or equal to p.

In one embodiment, the conductive repeating unit, M", is derived from the oxidative polymerization of one or more monomers selected from the group consisting of pyrrole, aniline, indole, phenylene diamines, thiophene, acetylene, phenylene, vinyl phenylene, vinyl thienylene; and their substituted derivatives. Suitable derivatives include, but are not limited to, alkyl derivatives, amine derivatives, and benzo derivatives. Examples of alkyl derivatives include methyl, ethyl, propyl, isopropyl, butyl, pentyl, hexyl, octyl, and decyl, such as N-methyl pyrrole, 3-methyl pyrrole, and 2-methyl aniline. Suitable conductive monomers include, but are not limited to:

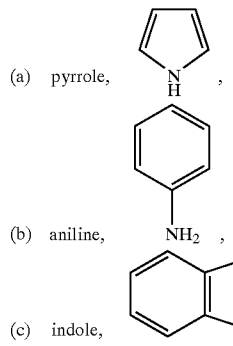

(a) pyrrole, (b) aniline, (c) indole,

-continued (d) isoindole, 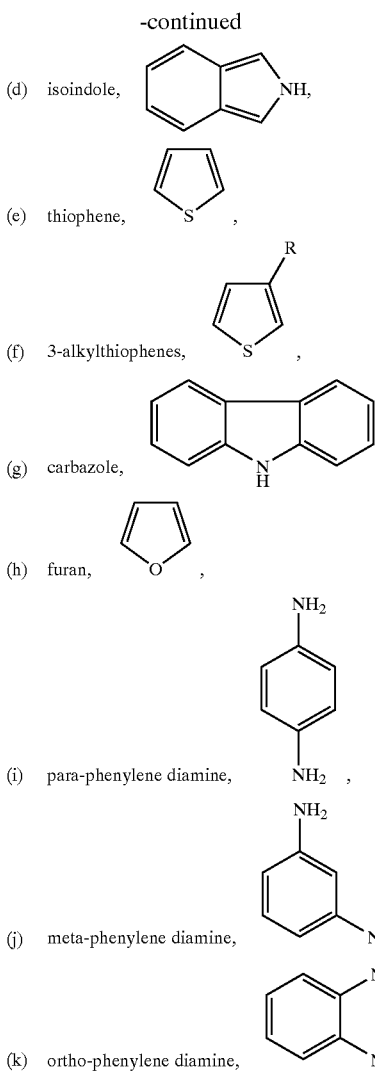

(e) thiophene, (f) 3-alkylthiophenes, (g) carbazole, (h) furan, (i) para-phenylene diamine, (j) meta-phenylene diamine, and (k) ortho-phenylene diamine, Other suitable conductive monomers include, but are not limited to, phenylene, acetylene, and phenylene-vinylene. The repeating units, M", may contain more than one of the suitable conductive monomers.

Suitable non-conductive repeating units, M', include, but are not limited to:

(a) vinyl imidazole, 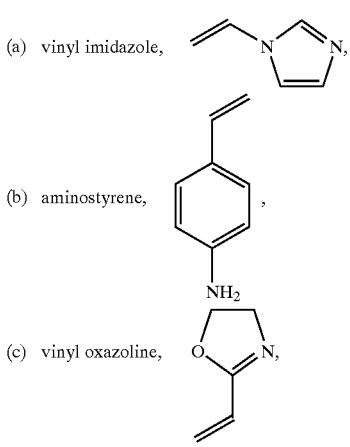

(b) aminostyrene, (c) vinyl oxazoline,

-continued (d) dimethylaminopropyl methacrylamide, (DMAPMA), 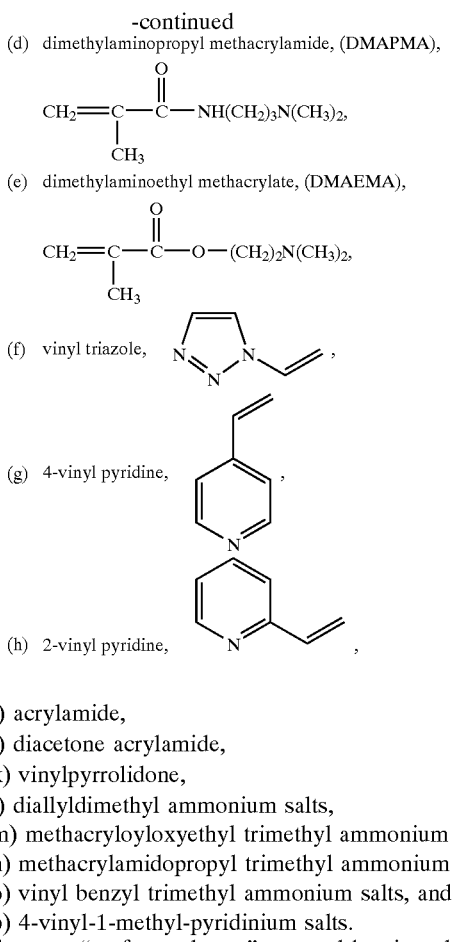

$$CH_2=C-C-NH(CH_2)_3N(CH_3)_2,$$
     $|$
     $CH_3$ (e) dimethylaminoethyl methacrylate, (DMAEMA), $$CH_2=C-C-O-(CH_2)_2N(CH_3)_2,$$
     $|$
     $CH_3$ (f) vinyl triazole, (g) 4-vinyl pyridine, (h) 2-vinyl pyridine, (i) acrylamide,
(j) diacetone acrylamide,
(k) vinylpyrrolidone,
(l) diallyldimethyl ammonium salts,
(m) methacryloyloxyethyl trimethyl ammonium salts,
(n) methacrylamidopropyl trimethyl ammonium salts,
(o) vinyl benzyl trimethyl ammonium salts, and
(p) 4-vinyl-1-methyl-pyridinium salts.

The term "graft copolymer", as used herein, relates to a polymer comprising one or more species of polymer segments connected to the main polymer backbone chain as side groups, and having molecular or configurational features that differ from those in the main a polymer backbone chain, exclusive of branch points.

The non-conductive repeating unit, M', may comprise more than one monomer providing that at least one of the monomers is capable of being a graft site for the conductive polymer segment. In one embodiment, the non-conductive polymer segments are copolymers derived from one or more suitable monomers. Preferred copolymers comprise cationic monomers and non-cationic monomers. Other co-monomers which may be polymerized with preferred non-conductive monomers include styrene, olefin, and similar vinyl compounds. A variety of functional groups can provide graft sites for the conductive polymer segments, for example, amine groups, methylene groups, and other reactive functional groups, which may interact with cation radicals and other intermediates which are present in the polymerization of the conductive monomers. Thus, for example, in addition to the examples of M' named in the embodiments of the invention, many amine containing polymeric materials may be used, including, but not limited to, polyethyleneimines, polyethylene polyamines, polyether amines, and amino substituted hydrocarbon polymers.

The number of conductive polymer segments, z, grafted on each non-conductive polymer segment is from 1 to about 100, with the proviso that the number of graft segments on the non-conductive polymer segment cannot be larger than the number of repeating units, p, of the non-conductive polymer segment. In other words, z is less than or equal to p. In a preferred embodiment, the ratio of z to p is from 1:5 to about 1:200.

The number of repeat units comprising the non-conductive polymer segment, p, is from 2 to 20,000. In other words, a wide range of molecular weights are suitable for the non-conductive polymer segment. The grafted conductive polymer segment comprises y repeat units. The number of repeat units in a preferred embodiment is from 8 to about 1000.

The amount of sulfur in the electroactive, grafted organic polymers of the present invention may vary over a wide range, such as, for example, from 45 to 95% by weight. In one embodiment, the electroactive organic polymers of the present invention comprise at least 50% by weight of sulfur. In a preferred embodiment, the electroactive polymers of the present invention comprise at least 75% by weight of sulfur.

The conductive polymer segments of the electroactive organic polymers of Formula II of the present invention are bonded to one or more polysulfide chains, wherein the polysulfide chains comprise one or more moieties selected from the group consisting of $—(S_m)—$, $—(S_m)^-$, and $(S_m)^{2-}$; where m is an integer from 3 to 200 and is the same or different at each occurrence. In one embodiment, m is an integer from 9 to 200 and is the same or different at each occurrence. In one embodiment, m is from 24 to 100 and is the same or different at each occurrence. The bonding of the polysulfide chains to the polymer may be ionic or covalent or both covalent and ionic. Covalent bonding of polysulfide chains, $—(S_m)—$, or $—(S_m)^-$, may be, for example, through C-S bonds or N-S bonds to the repeating units. Ionic bonding of polysulfide chains, $—(S_m)^-$, and $(S_m)^{2-}$, may be, for example, to N, S, or C positively charged atoms in the repeating units.

The polysulfide moieties may also be bonded to the non-conductive repeating unit, M', together with or in the absence of bonding of the polysulfide moieties to the conductive repeating unit, M". Thus, electroactive organic polymers of the present invention may be described by the formula (III)

$$[\{M'(S_m)^{x-}{}_n\}_y]_p[M'']_z \qquad \text{III}$$

where M', M", n, y, m, x, p, and z have the same meanings as described for formula (II). In another embodiment, electroactive organic polymers of the present invention may be described by the formula (IV)

$$[\{M'(S_m)^{x-}{}_n\}_y]_p[\{M''(S_m)^{x-}{}_n\}_y]_z \qquad \text{IV}$$

where M', M", n, y, m, x, p, and z have the same meanings as described for formula (II).

Methods for Making Polymers of Present Invention

Another aspect of the present invention pertains to processes for making the electroactive, grafted organic polymers of this invention.

In one embodiment of the methods of the present invention for preparing an electroactive organic polymer, as described herein, the methods comprise the steps of: (a) providing a dispersion of elemental sulfur in a liquid medium containing a non-conductive polymer; (b) adding to the dispersion of step (a) a precursor of a conductive polymer repeating unit and a polymerization initiator comprising an oxidant; (c) stirring the mixture of step (b) thereby forming an electroactive, grafted organic polymer; and (d) separating the polymer from the reaction medium.

Dispersion or suspension of elemental sulfur in the liquid medium can be carried out by methods known in the art for dispersing or suspending solids in liquids. For example, the elemental sulfur, such as flowers of sulfur, can be added with stirring to the liquid medium containing the non-conductive polymer to provide the dispersion or suspension. Alternatively, the elemental sulfur can be dispersed prior to dissolution of the non-conductive polymer in the liquid medium. In one embodiment, the particle size of the elemental sulfur dispersed in the liquid medium is from about 0.01 microns to 100 microns.

In an alternative method, the dispersion of elemental sulfur may be made in situ from reduced sulfur moieties such as, for example, sulfide anions, polysulfide anions, or polysulfanes by oxidation. Examples of suitable reduced sulfur moieties include, but are not limited to, $M_2 (S_r)$, and $H_2(S_r)$, where M is Li, Na, K, or $NH_4$, and r is an integer from 1 to 8. For example, the polymerization initiator comprising an oxidant may both initiate polymerization and oxidize reduced sulfur species. An electroactive organic polymer of the present invention may be formed from a mixture of one or more monomers, reduced sulfur moieties, a non-conductive polymer, and a polymerization initiator comprising an oxidant in a liquid medium.

The liquid medium for providing the elemental sulfur dispersion must be compatible with the oxidant polymerization initiator and, further, be able to dissolve the non-conductive polymer. The liquid medium may be aqueous or non-aqueous and may be a single solvent or a multi-component solvent mixture. In a preferred embodiment of the invention, the liquid medium comprises water. Additional liquids may be used in the liquid medium to enhance the dispersion of the hydrophobic sulfur. For example, water miscible liquids such as alcohols may be used in volume ratios of alcohol to water of from about 1:5 to about 1:20. It is well known that surfactants can aid the dispersion or suspension of solids in liquid media, such as water. Surfactants may optionally be added to the liquid medium for assistance in dispersing or suspending the sulfur in the methods of the present invention. Suitable surfactants include anionic, cationic, and non-ionic surfactants. Examples of suitable surfactants include, but are not limited to, alkylbenzene sulfonates, alkyl sulfonates, alkyl sulfates, alkyl phosphates, dialkyl sulfosuccinates, ethoxylated alcohols, ethoxylated alkylphenols, acetylenic alcohols, trimethylalkyl ammonium halides, benzyl trimethyl ammonium halides, alkyl pyridinium halides, and alkylamine N-oxides. The choice of surfactant, which must be compatible with the non-conductive polymer, can be made by experimentation for quality of dispersion and compatibility with the non-conductive polymer, the precursor selected for a conductive polymer repeating unit, and the polymerization initiator.

The non-conductive polymer segments of the polymers of the present invention may be obtained from the respective monomers by standard methods of polymerization, such as, for example, by radical initiation.

The oxidative polymerization of pyrrole and aniline in the presence of inorganic powders and granular materials has been described, for example, in U.S. Pat. No. 4,937,060, to Kathirgamanathan et al. By this polymerization process, talc, mica, wollastonite, calcium carbonate, aluminum hydroxide, or hydroxyapatite were coated with conductive polymer.

Graft copolymers have been described in which conductive polymer segments have been grafted onto non-conductive polymers. For example, in U.S. Pat. Nos. 5,278, 241 and 5,376,728, to Patil et al., are described amino-substituted polymers which carry conductive graft polymer segments derived from aromatic nitrogen-containing monomers, such as anilines. Li et al., in *Synthetic Metals*, 1987, 20, 141–149, describe graft polymerization of aniline onto poly(aminostyrene). In U.S. Pat. No. 4,959,180, Armes et al., describe colloidal polymers in which amino-substituted aromatic monomers, such as aniline, are polymerized in the presence of aminostyrene copolymers. Simmons et al., in *Langmuir*, 1998, 14, 611–618, report the formation of polypyrrole graft copolymers from a series of non-conductive copolymers, each containing thiophene moieties as the grafting site.

While not wishing to be bound by any theory, the polymerization of the monomers of the conductive polymer segment repeating units in the presence of the non-conductive polymer and the finely dispersed sulfur particles may be viewed as a simultaneous graft polymerization sulfur coating process, and sulfur chemical bonding process. In other words, as the polymerization of the monomers proceeds, the sulfur particles are coated by the developing polymer, which is a graft polymer of the conductive segment onto the non-conductive polymer, and at the same time, chemical bonding takes place to the sulfur particles which react to form polysulfide chains. No specific mechanism can be ascribed but oxidative polymerization of pyrrole or aniline, for example, in the presence of non-conductive polymer and sulfur particles may create graft polymers with bonded polysulfide chains in a number of ways. For example, polymerization of pyrrole or aniline may be initiated by an oxidant to form a polymer segment of a few units which grafts to the non-conductive polymer. Once grafted to the non-conductive polymer, the conductive segment may add more repeat units, or may not add more repeat units, and then may terminate by reaction at the surface of sulfur particles.

An alternative path to the polymers of this invention may involve the conductive polymer segments (of pyrrole or aniline, for example) bonding with sulfur particles. Once bonded to sulfur, the conductive polymer segment may add more repeat units, or may not add more repeat units, and then may react by grafting with the non-conductive polymer. Polymerization of pyrrole or aniline initiated by oxidants is believed to involve radical cation species. Additionally, the oxidant may react with sulfur and with the non-conductive polymer to create reactive sites from which the conductive polymer chains are built. It is known that the $S_8$ rings in elemental sulfur are readily opened by such radical cation species to form polysulfide chains (Voronkov et al., *Reactions of Sulfur with Organic Compounds*, 1987, 40–44, Consultants Bureau, New York; and Pryor, *Mechanisms of Sulfur Reactions*, 1962, 7–15, McGraw-Hill, New York). Some or all of these possibilities may operate simultaneously depending on the specific reactants and reaction conditions. In other words, the elemental sulfur may participate in the formation of the electroactive organic polymers with bonded polysulfide chains in both terminator and initiator roles and, likewise, the conductive and the non-conductive polymer segments may play initiator and terminator roles.

In one embodiment of the methods of the present invention, the weight ratio of conductive polymer segments to non-conductive polymer segments is from about 1:1 to about 20:1.

In one embodiment of the methods of this invention, the weight ratio of the combined organic polymer segments, conductive and non-conductive, to elemental sulfur is from about 1:1 to about 1:15.

Many oxidants are known to induce polymerization of monomers to form conductive polymers. The choice of oxidant will depend upon the monomer which is to be polymerized, the amount of grafting desired, the length of the grafts, the overall molecular weight desired, and other factors. For example, in the self-branching type of grafting of conductive polymer segments onto a conductive polymer backbone, the reaction conditions for the preparation of two dimensional polypyrroles and their electronic and magnetic properties have been described by Schmeisser et al., *Synthetic Metals*, 1998, 93, 43–58. Also, the polymerization of aniline in the presence of additives by electrochemical methods is described by Wei et al., *J. Phys. Chem.*, 1990, 94, 7716–7721. Also noted by these authors are cross-linking or branching reactions of aniline from the oxidative polymerization with strong chemical oxidants, by the electrochemical oxidation of aniline at high applied potential, and by the incorporation of difunctional additives. Thus, the grafted conductive polymer segments in the organic polymers of this invention may be branched or non-linear segments.

Suitable oxidants as initiators of the polymerization include, but are not limited to, $FeCl_3$, $Fe(NO_3)_3$, $CUCl_2$, $H_2O_2$, $(NH_4)_2S_2O_8$, $KIO_3$, $I_2$, $KMnO_4$, $)NH_4)_2Cr_2O_7$, and $K_2Cr_2O_7$. The concentration of oxidant for the methods of this invention is typically close to that required by the stoichiometry of the oxidative process. Concentrations lower or higher than that required by the stoichiometry, such as from 85% to 150%, may be used. It is generally preferred to use a concentration from 100% to 120% of the amount required by the stoichiometry to obtain an acceptable reaction rate and monomer conversion. Furthermore, excess oxidant may add cost without commensurate improvement in rate or yield.

The oxidative polymerization of the conductive monomers of this invention can be carried out at temperatures from about −30° C. to about 80° C. It is preferred to use a temperature at or above ambient temperature which enhances the grafting of the conductive polymer. Preferred temperatures are from about 20° C. to about 50° C.

The oxidant, in addition to initiating the formation of organic graft polymer bonded polysulfide chains, may directly oxidize the elemental sulfur, thereby introducing S—O bonds. These S—O species, such as for example, —$(S_m)$—$SO_3^-$ or —$(S_m)$—$SO_{2-}$, where m is as noted hereinabove, may be present in the polymers of the present invention. In one embodiment, the polysulfide chains of the electroactive polymers of the present invention further comprise —$(S_m)$—$SO_2^-$, where m is an integer from 3 to 200 and is the same or different at each occurrence. In one embodiment, the polysulfide chains of the electroactive polymers of this invention further comprise —$(S_m)$—$SO_3^-$, where m is an integer from 3 to 200 and is the same or different at each occurrence. Certain of the oxidative polymerization initiators are more powerful oxidants and may generate a higher concentration of these S—O species. Likewise more vigorous reaction conditions, such as higher temperature, may generate higher concentration of S—O species. These S—O species are thiophiles which can also readily react with and open elemental sulfur $S_8$ rings to further promote the polymerization process to form the polymers of the present invention.

Separating the electroactive organic polymers from the reaction medium can be performed by procedures known in the art for the separation of solids from liquids. The polymers, which are typically insoluble in the liquid medium, can, for example, be separated by filtration, by centrifugation, or by simply decantation. After separation, the polymer may be further purified by washing with liquids which will remove impurities but will not dissolve the polymer, such as water or organic liquids. After separation and any purification, it is normally desirable to dry the polymer. Drying can be performed by any of the drying methods known in the art.

Cathodes Comprising Electroactive, Graft Polymers

One embodiment of the present invention pertains to a composite cathode for use in an electrochemical cell comprising: (a) an electroactive, graft organic polymer, which polymer, in its oxidized state, comprises conductive polymer segments and non-conductive polymer segments; wherein one or more of the conductive and non-conductive polymer segments are bonded to polysulfide chains; and, wherein the polysulfide chains comprise one or more moieties selected from the group consisting of $-(S_m)-$, $-(S_m)^-$, and $(S_m)^{2-}$; where m is an integer from 3 to 200 and is the same or different at each occurrence; and (b) one or more conductive fillers selected from the group consisting of conductive carbons, graphites, activated carbon fibers, non-activated carbon nanofibers, metal flakes, metal powders, metal fibers, carbon fabrics, metal mesh, electrically conductive polymers, and electrically conductive transition metal chalcogenides. The polysulfide chains may be bonded to one or more conductive polymer segments only, to one or more non-conductive polymer segments only, or to one or more of both conductive and non-conductive polymer segments.

In one embodiment, the polymer of (a) provides the electrically conductive filler of (b) based on the electrically conductive properties of the polymer of (a).

The composite cathode may further comprise one or more other additives, such as, for example, binders, electrolytes, non-electroactive metal oxides, and electroactive metal chalcogenides, as known in the art.

In one embodiment, the composite cathode of the present invention further comprises elemental sulfur.

Methods Of Making Cathodes Comprising Electroactive, Graft Polymers

One aspect of the present invention pertains to methods for fabricating composite cathodes comprising the electroactive organic polymers of the present invention.

In one embodiment of the method for preparing a composite cathode of the present invention, the method comprises the steps of: (a) dispersing or suspending in a liquid medium the electroactive polymer, as described herein; (b) optionally adding to the mixture of step (a) a conductive filler; (c) mixing the composition resulting from step (b) to disperse the electroactive polymer, thereby forming a composition having a desired consistency and particle size distribution; (d) casting the composition resulting from step (c) onto a suitable substrate; and (e) removing some or all of the liquid from the composition resulting from step (d) to provide a composite cathode. In one embodiment, the method further comprises, subsequent to step (e), the step (f) of heating the composite cathode structure to a temperature of 120° C. or greater.

The methods may further comprise the addition to any or all of steps (a), (b), or (c) of one or more additives selected from the group consisting of binders, electrolytes, non-electroactive metal oxides, and electroactive metal chalcogenides.

Examples of liquid media suitable for use in the methods of the present invention include aqueous liquids, non-aqueous liquids, and mixtures thereof. Especially preferred liquids are non-aqueous liquids such as methanol, ethanol, isopropanol, propanol, butanol, tetrahydrofuran, dimethoxyethane, acetone, toluene, xylene, acetonitrile, and cyclohexane.

Mixing of the various components may be accomplished using any of a variety of methods so long as the desired dissolution or dispersion of the components is obtained. Suitable methods of mixing include, but are not limited to, mechanical agitation, grinding, ultrasonication, ball milling, sand milling, and impingement milling.

The formulated dispersions may be applied to substrates by any of a variety of well-known coating methods and dried using conventional techniques. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Examples of suitable substrates include, but are not limited to, metal foils, polymer films, metal grids, release substrates, and other substrates commonly known in the art. Removal of some or all of the liquid from the mixture may be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply air drying if convenient.

Electrochemical Cells and Methods of Making Same

One aspect of the present invention pertains to an electrochemical cell which comprises: (a) an anode; (b) a composite cathode comprising an electroactive organic polymer of the present invention, as described herein; and (c) an electrolyte interposed between the anode and the composite cathode.

The cells comprising the electroactive, graft organic polymers of the present invention possess properties which are advantageous in several respects. The grafted polymer structures, which by their nature are branched from the polymer backbone at each graft site, typically enhance the cycling ability of the cells, for example, in relation to non-branched polymer materials. Furthermore, the conductive segments of the graft polymers of the present invention may be branched. The grafted branched structures exhibit useful thermal stability, oxidative stability, and mechanical properties in the fabrication of the composite cathodes. The grafted polymers also typically possess high electrical conductivity which is, furthermore, maintained over a wide temperature. This results in good low temperature and ambient temperature performance of the cells. By virtue of the grafted and branched structure in conjunction with the desired high sulfur content of the polymers of the present invention, the chain length of the polysulfide chains, in the oxidized state of the polymer, is typically long, such as, for example, greater than eight sulfur atoms.

Another aspect of the present invention pertains to methods of forming an electrochemical cell, the methods comprising the steps of: (a) providing an anode; (b) providing the composite cathode of the present invention, as described herein; and (c) interposing an electrolyte between the anode and the cathode.

Suitable anode materials for the electrochemical cells of the present invention include, but are not limited to, lithium metal, lithium-aluminum alloys, lithium-tin alloys, lithium-intercalated carbons, and lithium-intercalated graphites.

Examples of suitable electrolytes for use in the present invention include, but are not limited to, non-aqueous electrolytes comprising one or more materials selected from the group consisting of liquid electrolytes, gel polymer electrolytes, and solid polymer electrolytes.

Examples of useful liquid electrolytes include, but are not limited to, liquid electrolyte solvents, such as, for example, N-methyl acetamide, acetonitrile, carbonates, sulfones, sulfolanes, aliphatic ethers, cyclic ethers, glymes, siloxanes, dioxolanes, N-alkylpyrrolidones, substituted forms of the foregoing, and blends thereof; to which is added an appropriate ionic electrolyte salt.

These liquid electrolyte solvents are themselves useful as plasticizers for gel polymer electrolytes. Examples of useful gel polymer electrolytes include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes, such as, for example, NAFION™ resins, polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing; to which is added an appropriate ionic electrolyte salt.

In addition to solvents, gelling agents, and ionically conductive polymers as known in the art for non-aqueous electrolytes, the non-aqueous electrolyte further comprises one or more ionic electrolyte salts, also as known in the art, to increase the ionic conductivity.

Examples of ionic electrolyte salts for use in the present invention include, but are not limited to, MSCN, MBr, MI, MClO$_4$, MAsF$_6$, MSO$_3$CF$_3$, MSO$_3$CH$_3$, MBF$_4$, MB(Ph)$_4$, MPF$_6$,

MC(SO$_2$CF$_3$)$_3$, MN(SO$_2$CF$_3$)$_2$,

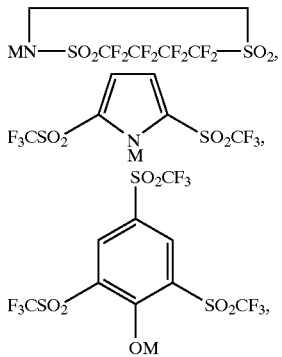

and the like, where M is Li or Na. Other electrolyte salts useful in the practice of this invention are lithium polysulfides, lithium salts of organic ionic polysulfides, and those disclosed in U.S. Pat. No. 5,538,812 to Lee et al. Preferred ionic electrolyte salts are LiI, LiSCN, LiSO$_3$CF$_3$ (lithium triflate), LiN(SO$_2$CF$_3$)$_2$ (lithium imide), and LiC(SO$_2$CF$_3$)$_3$ (lithium methide).

EXAMPLES

Several embodiments of the present invention are described in the following examples, which are offered by way of illustration and not by way of limitation.

Example 1

Poly(1-vinylimidazole) was prepared from vinylimidazole (50 g) in water (250 mL) using 2,2'-azobis(2-methylpropionamidine) dihydrochloride (0.5 g) as initiator. The molecular weight was estimated to be 20,000 by viscometry.

To 2000 mL of deionized water in a 5 liter flask equipped with a mechanical stirrer, 75 mL (72.5 g, 1.08 mol) of pyrrole and 15 g (0.16 mol) of poly(1-vinylimidazole) in 150 mL of water were added. After dissolution of the pyrrole, 500 g of elemental sulfur was added, and the resulting mixture was stirred for 0.5 hours. A solution of 280 g of Na$_2$S$_2$O$_8$ (1.17 mol) in 750 mL of deionized water was added dropwise during 3 hours while maintaining the temperature near 40° C. After the addition of the Na$_2$S$_2$O$_8$ solution was complete, the reaction mixture was stirred for an additional 2 hours. The black solid product was filtered, washed with deionized water and with acetone, and dried under vacuum at 20–40° C. for 24 hours. The yield of grafted polymer was 98%. Analysis: C, 8.54%; N, 2.60%; S, 86.39%.

Example 2

To 2000 mL of deionized water in a 5 liter flask equipped with a mechanical stirrer was slowly added 70 mL (0.8 mol) of concentrated HCl. To the resulting solution, 74 mL (75.6 g, 0.8 mol) of aniline and 15 g (0.16 mol) of poly(1-vinylimidazole in 150 mL of water was added. After dissolution of the aniline, 500 g of elemental sulfur was added, and the resulting mixture was stirred for 0.5 hours. A solution of 205 g of Na$_2$S$_2$O$_8$ in 750 mL of deionized water was added dropwise during 3 hours while maintaining the temperature near 40° C. After the addition of the Na$_2$S$_2$O$_8$ solution was complete, the reaction mixture was stirred for an additional 2 hours. The black solid product was filtered, washed with deionized water and with acetone, and dried under vacuum at 20–40° C. for 24 hours. The yield of grafted polymer was 95%. Analysis: C, 8.15%; N, 1.40%; S, 88.35%.

Example 3

To a stirred solution of pyrrole (24.2 g, 0.36 mol) and polyethyleneimine (2.55 g, MW 25,000), (available from Aldrich Chemical Co., Milwaukee, Wis.), in distilled water (700 mL) was added elemental sulfur (166.7 g, 5.2 mol). Stirring was continued for 30 minutes to disperse the sulfur. To the stirred dispersion was slowly added a solution of Na$_2$S$_2$O$_8$ (93.34 g, 0.39 mol) in 250 mL of water while maintaining the temperature at 25° C. Stirring was continued for 3 hours, at which time the dark solids were filtered and washed with water and then with acetone. After drying at 20–40° C. under vacuum overnight, 180 g of graft polymer was obtained. Analysis gave the following results: C, 8.13%; N, 2.14%; 5, 89%.

Example 4

To a stirred solution of aniline, (25.2 g, 0.27 mol), and polyethyleneimine, (2.58 g, MW 25,000), in distilled water (700 mL) containing concentrated HCl (23.3 mL) was added elemental sulfur (166.7 g, 5.2 mol). Stirring was continued for 30 minutes to disperse the sulfur. To the stirred dispersion was slowly added a solution of $Na_2S_2O_8$ (68.33 g, 0.29 mol) in 250 mL of water while maintaining the temperature at 35° C. Stirring was continued for 2 hours, at which time the dark solids were filtered and washed with water and then twice with acetone. After drying at 20–40° C. under vacuum overnight, 166 g of graft polymer was obtained. Analysis gave the following results: C, 7.62%; N, 1.28%; S, 86%.

Example 5

A cathode was prepared by coating a mixture of 75 parts of the polymer of Example 1, 10 parts of a conductive carbon pigment PRINTEX XE-2 (a trademark for a carbon pigment available from Degussa Corporation, Akron, Ohio), and 15 parts of graphite (available from Fluka, Milwaukee, Wis.) dispersed in isopropanol onto a 17 micron thick conductive carbon coated aluminum foil substrate (Product No. 60303 available from Rexarn Graphics, South Hadley, Mass.). After drying and calendering, the cathode coating thickness was about 12 microns. The anode was lithium foil of about 30 microns in thickness. The electrolyte was a 1.4 M solution of lithium bis(trifluoromethylsulfonyl)imide (available from 3M Corporation, St. Paul, Minn.) in a 42:58 volume ratio mixture of 1,3-dioxolane and 1,2-dimethoxyethane. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were combined into a layered structure of cathode/separator/anode, which was wound and compressed, with the liquid electrolyte filling void areas of the separator and cathode to form prismatic cells with an electrode area of about 200 $cm^2$. Discharge-charge cycling on these cells was done at 0.3/0.3 $mA/cm^2$, respectively, for cycles 1 to 5 and then at 0.45/0.3 $mA/cm^2$, respectively, for subsequent cycles, with discharge cutoff at a voltage of 1.3V and charge cutoff at 3V or 5 hour charge, whichever came first. Typical specific capacities of these cells were 602 mAh/g at the $5^{th}$ cycle and 546 mAh/g at $50^{th}$ cycle, a fade rate of 0.22% per cycle.

Example 6

A cathode was prepared by the procedure of Example 5 except that 65 parts of the polymer of Example 1, 15 parts of conductive carbon, PRINTEX XE-2, and 20 parts of graphite were used.

The components were combined into a layered structure of cathode/separator/anode, which was wound and compressed, with the liquid electrolyte filling void areas of the separator and cathode to form prismatic cells with an electrode area of about 200 $cm^2$. Discharge-charge cycling on these cells was done at 0.3/0.3 $mA/cm^2$, respectively, for cycles 1 to 5 and then at 0.45/0.3 $mA/cm^2$, respectively, for subsequent cycles, with discharge cutoff at a voltage of 1.3V and charge cutoff at 3V or 5 hour charge, whichever came first. Typical specific capacities of these cells were 650 mAh/g at the $5_{th}$ cycle and 550 mAh/g at $70^{th}$ cycle, a fade rate of 0.24% per cycle.

While the invention has been described in detail and with reference to specific embodiments thereof, it will be apparent to one skilled in the art that various changes and modifications can be made without departing from the spirit and scope thereof.

What is claimed is:

1. An electroactive (organic polymer, wherein said polymer, in its oxidized state, comprises one or more conductive polymer segments and non-conductive polymer segments; wherein one or more of said conductive polymer segments or said non-conductive polymer segments are bonded to polysulfide chains; and further wherein said polysulfide chains comprise one or more moieties selected from the group consisting of —$(S_m)$—, —$(S_m)^-$, and $(S_m)^{2-}$; where m is an integer from 3 to 200 and is the same or different at each occurrence.

2. The polymer of claim 1, wherein said polysulfide chains comprise one or more —$(S_m)$—, —$(S_m)^-$, and $(S_m)^{2-}$ moieties.

3. The polymer of claim 1, wherein said conductive polymer segments are grafts on a polymer backbone comprising the non-conductive polymer segments.

4. The polymer of claim 1, wherein said conductive polymer segments comprise one or more moieties formed by polymerization of one or more monomers selected from the group consisting of pyrrole, aniline, indole, phenylene diamines, thiophene, acetylene, phenylene, vinyl phenylene, vinyl thienylene; and their substituted derivatives.

5. The polymer of claim 1, wherein said conductive polymer segments comprise pyrrole.

6. The polymer of claim 1, wherein said conductive polymer segments comprise aniline.

7. The polymer of claim 1, wherein said non-conductive polymer segments comprise one or more moieties formed by polymerization of one or more monomers selected from the group consisting of vinyl imidazole, aminostyrene, vinyl oxazoline, dimethylaminopropyl methacrylamide, diethylaminoethyl methacrylate, vinyl pyridine, acrylamide, diacetone acrylamide, vinylpyrrolidone, diallyldimethyl ammonium salts, methacryloyloxyethyl trimethyl ammonium salts, methacrylamidopropyl trimethyl ammonium salts, vinyl benzyl trimethylammonium salts, and vinyl-1-methyl-pyridinium salts.

8. The polymer of claim 1, wherein said non-conductive polymer segments comprise vinyl imidazole.

9. The polymer of claim 1, wherein said non-conductive polymer segments comprise aminostyrene.

10. The polymer of claim 1, wherein said conductive polymer segments comprise pyrrole and said non-conductive polymer segments comprise vinyl imidazole.

11. The polymer of claim 1, wherein said conductive polymer segments comprise aniline and said non-conductive polymer segments comprise vinyl imidazole.

12. The polymer of claim 1, wherein said bonding of the polysulfide chains, —$(S_m)$—, to said conductive and non-conductive polymer segments is covalent.

13. The polymer of claim 1, wherein said polysulfide chains comprise covalent moieties, —$(S_m)$—, which covalent moieties are covalently bonded by one or both of their terminal sulfur atoms as a side group to the polymer.

14. The polymer of claim 1, wherein said polysulfide chains comprise polysulfide anion moieties, —$(S_m)^-$, which anion moieties are covalently bonded by a terminal sulfur atom to said polymer.

15. The polymer of claim 1, wherein said polysulfide chains comprise polysulfide dianion, moieties, $(S_m)^{2-}$, and said conductive polymer segments or said non-conductive polymer segments comprise positively charged atoms, wherein said dianion moieties are ionically bonded to one or more of said positively charged atoms.

16. The polymer of claim 1, wherein said polymer comprises greater than 50% by weight of sulfur.

17. The polymer of claim 1, wherein said polymer comprises greater than 75% by weight of sulfur.

18. The polymer of claim 1, wherein said polymer is utilized in an electrochemical cell.

* * * * *